AUTODYNE CONVERTER

Filed Jan. 17, 1946

INVENTORS.
JOHN W. CHRISTENSEN
JOHN V. GRANGER
JOHN J. WEDEL
BY William D. Hall
ATTORNEY Patented Nov. 10, 1953 2,658,995

UNITED STATES PATENT OFFICE 2,658,995

AUTODYNE CONVERTER

John W. Christensen, Cedar City, Utah, John V. Granger, Cambridge, Mass., and John J. Wedel, Seattle, Wash., assignors to the United States of America as represented by the Secretary of War Application January 17, 1946, Serial No. 641,837

5 Claims. (Cl. 250—20)

This invention relates generally to an electrical circuit and more particularly to an autodyne converter circuit wherein a single triode vacuum tube may be used as both a high frequency converter and as an oscillator.

An object of this invention is to provide a circuit whereby a radio frequency signal may be converted to an intermediate frequency signal by means of a single triode vacuum tube.

Another object is to provide a converter circuit which is particularly adapted to ultra high frequency (U. H. F.) applications and which affords a high signal-to-noise ratio. The signal-to-noise ratio (S/N) is defined as the ratio of the root-mean-square (R. M. S.) signal voltage appearing at the output of the converter to the R. M. S. noise voltage. Noise signals originate in the circuit itself as small unpredictable fluctuations of a voltage or current.

Figure 1:
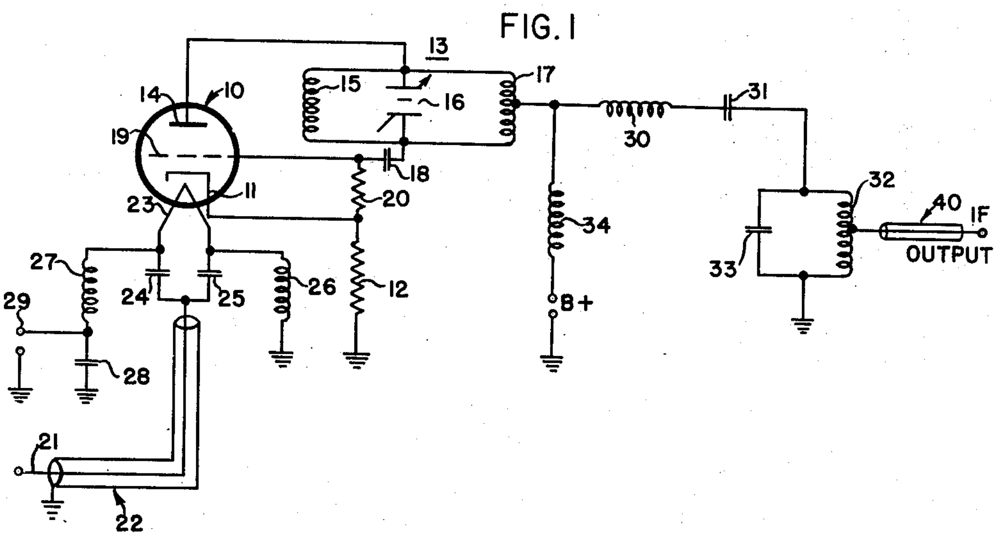
Figure 2:
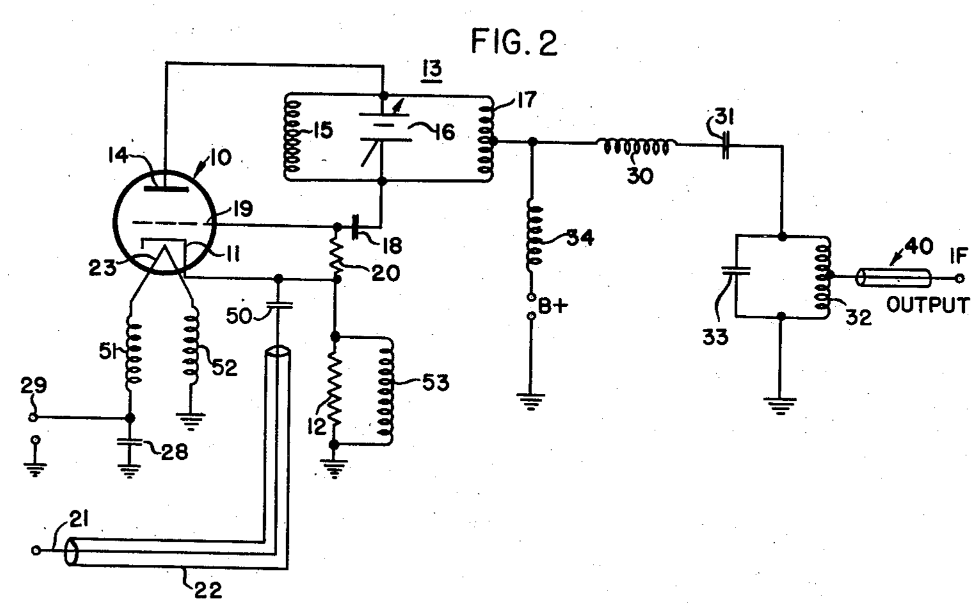

Other objects, features and advantages of this invention will suggest themselves to those skilled in the art and will become apparent from the following description of the invention taken in connection with the accompanying drawing, in which:

Fig. 1 is a schematic diagram of a circuit embodying the principles of this invention; and Fig. 2 is a schematic diagram of an alternative embodiment of this invention.

In Fig. 1, cathode 11 of a triode vacuum tube 10 is returned through resistance 12 to radio frequency (R. F.) ground potential. One end of a so-called butterfly tank circuit 13 is connected to anode 14 of triode vacuum tube 10. Butterfly tank circuit 13 includes an inductance 15, a variable capacitance 16 and a center tapped inductance 17, all in parallel. The opposite end of the butterfly tank circuit 13 is returned through coupling condenser 18 to control grid 19 of triode vacuum tube 10. Control grid 19 is also connected to cathode 11 through bias resistor 20.

The radio frequency input signal is applied through center conductor 21 of coaxial cable 22 to a balanced feed network associated with the heater filament 23 of triode vacuum tube 10. The balanced feed network of the filament circuit includes two capacitors 24 and 25 in series with each filament lead respectively. One filament lead is returned directly to ground through choke coil 26. The opposite filament lead is returned through choke coil 27 and by-pass condenser 28 to ground potential. Filament heater voltage is applied through terminal 29 and thence through the choke coil 27 to the heater filament of the triode vacuum tube.

The output of the butterfly tank circuit 13 is taken from the center tap of inductance coil 17 and applied in series through an inductance 30, a capacitance 31 and a parallel circuit which includes a center-tapped inductance 32 and variable capacitance 33 to radio frequency ground potential. The output of the parallel resonant circuit is taken from the center tap of inductance 32, and appears in the coaxial line 40.

Plate potential is applied from a suitable source of positive potential, designated herein as B+, through a choke 34 to the center tap of split inductance 17 in butterfly tank circuit 13.

Briefly, the radio frequency signal is coupled into the cathode circuit of tube 10 and is mixed with the local oscillator signal which is generated in the plate-grid circuit of the triode vacuum tube. The intermediate frequency is derived from the converter by means of the two resonant circuits.

Inductance 15, split inductance 17 and variable capacitance 16, all in parallel and connected between the grid-plate circuit form a tuned butterfly tank circuit the resonant frequency of which is the local oscillator frequency. Self-bias for the oscillator portion of the converter circuit is provided by grid resistor 20 and coupling capacitor 18.

The radio frequency signal is injected into the cathode circuit of the triode vacuum tube 10 through the coupling afforded by the internal heater-cathode capacitance of the tube, it then mixes with the signal generated by the local oscillator portion of the circuit to produce intermediate frequency oscillations.

The intermediate frequency output of the converter circuit is taken from the center tap of split inductance 17 and applied through the series resonant circuit which includes inductance 30 and capacitance 31 to a parallel resonant circuit which includes split inductance 32 and variable capacitor 33. The series resonant circuit is resonant at the intermediate frequency and provides a low impedance path for the intermediate frequency currents but a high impedance path for the local oscillator and the radio frequency signals. The above resonant circuit combination prevents undue loading of the butterfly tuned circuit in the oscillator portion of the converter circuit.

The parallel resonant circuit is also resonant at the intermediate frequency and serves as a high impedance load across which the intermediate frequency voltage is developed and taken out through coaxial line 40. The particular R. F. signal, balanced feed cathode input coupling shown in Fig. 1 and resistance 20 in the cathode grid circuit will give optimum S/N ratio.

As mentioned previously, the radio frequency signal is injected into the converter circuit through the internal heater-cathode capacitance of the triode vacuum tube. When injected in such a manner, the circuit is particularly adapted to convert relatively high radio frequency to the intermediate frequency signal desired.

Referring to Fig. 2, there is shown a second embodiment of this invention in which the radio frequency signal is injected directly into the cathode circuit of the triode vacuum tube. The elements designated in Figs. 1 and 2 with identical reference numerals are identical in function and purpose. In this embodiment the radio frequency signal is injected through a coupling condenser 50 to cathode 11 of triode vacuum tube 10. Each of the two heater filament leads is provided with a radio frequency choke 51 or 52, respectively. Heater filament voltage is again applied through terminal 29 to heater filament 23 of triode vacuum tube 10. A radio frequency choke 53 is shunted across resistor 12 in this embodiment. This second embodiment is particularly adapted to the conversion of a relatively low radio frequency signal input to an intermediate frequency signal as desired.

While there have been described hereinabove what are at present considered to be the preferred embodiments of this invention, it will be obvious to those skilled in the art that various changes and modifications may be made therein without departing from the scope of the invention.

What is claimed is:

1. An autodyne converter comprising an electron discharge device having a single anode, a control grid, and a single cathode, first impedance means connecting said cathode to a point of reference potential, means for impressing a given radio-frequency signal from an external source across said first impedance means, means including a resonant tank circuit regeneratively coupling said anode to said control grid to effect the generation of oscillations at a different radio-frequency from said given signal, second impedance connecting said tank circuit to a positive point of potential relative to said point of reference potential, and output means coupled to said tank circuit for selecting a beat frequency of said given and said different radio-frequencies.

2. An autodyne converter according to claim 1, wherein said electron discharge device includes a heater distinct from said cathode and in spaced relationship therewith to form a capacitance therebetween, and wherein said given signal is applied to said heater, whereby said given signal is coupled to said first impedance means through said capacitance.

3. An autodyne converter according to claim 1, wherein said output means includes a series resonant circuit at said beat frequency, a parallel resonant circuit at said beat frequency which is serially connected to said series resonant circuit, and means for obtaining an output from said parallel resonant circuit.

4. An autodyne converter according to claim 1, wherein said second impedance means is a reactance.

5. An electron network comprising an electron discharge device having at least an anode, a cathode, and a heater for said cathode, said cathode being in insulated relationship with said heater to form a capacitance therebetween, an impedance means connecting said cathode to a point of reference potential; and a pair of input terminals for said network to which a given radio-frequency signal from an external source is adapted to be connected, said terminals being connected respectively to said heater and said point of reference potential, said capacitance at said radio-frequency having an impedance which is small relative to the impedance of said impedance means.

JOHN W. CHRISTENSEN.
JOHN V. GRANGER.
JOHN J. WEDEL.

References Cited in the file of this patent

UNITED STATES PATENTS

| Number | Name | Date |
|---|---|---|
| 1,592,934 | Hartley | July 20, 1926 |
| 1,603,282 | Heising | Oct. 19, 1926 |
| 1,888,430 | Miller | Nov. 22, 1932 |
| 1,950,410 | Lake | Mar. 13, 1934 |
| 1,996,847 | Zimmerman | Apr. 9, 1935 |
| 2,045,982 | Elliott | June 30, 1936 |
| 2,097,514 | Chaffee | Nov. 2, 1937 |
| 2,128,750 | Kriebel | Aug. 30, 1938 |
| 2,189,402 | Pasma | Feb. 6, 1940 |
| 2,267,520 | Dow | Dec. 23, 1941 |
| 2,434,474 | Strutt | Jan. 13, 1948 |
| 2,435,262 | Wurmser | Feb. 3, 1948 |
| 2,459,117 | Oliver | Jan. 11, 1949 |
| 2,508,048 | Sziklai | May 16, 1950 |

FOREIGN PATENTS

| Number | Country | Date |
|---|---|---|
| 421,287 | Great Britain | Dec. 17, 1934 |
| 524,588 | Great Britain | Aug. 9, 1940 |